United States Patent [19]

Kitagawa

[11] Patent Number: 5,067,025
[45] Date of Patent: Nov. 19, 1991

[54] METHOD OF RECORDING HALFTONE DOT IMAGE

[75] Inventor: Osamu Kitagawa, Kyoto, Japan
[73] Assignee: Dainippon Screen Mfg. Co., Ltd., Japan
[21] Appl. No.: 582,236
[22] Filed: Sep. 14, 1990

[30] Foreign Application Priority Data

Sep. 14, 1989 [JP] Japan ................................. 1-239056

[51] Int. Cl.⁵ .............................................. H04N 1/23
[52] U.S. Cl. .................................. 358/298; 358/458; 358/456; 358/75
[58] Field of Search ............... 346/140 R; 358/75, 78, 358/80, 298, 454, 455, 456, 457, 458

[56] References Cited

U.S. PATENT DOCUMENTS 4,814,886 3/1989 Kuge et al. ....................... 358/457
4,903,123 2/1990 Kawamura et al. ................ 358/75
4,924,301 5/1990 Surbrook ........................... 358/454

Primary Examiner—William M. Shoop, Jr.
Assistant Examiner—Larry Moskowitz
Attorney, Agent, or Firm—Ostrolenk, Faber, Gerb & Soffen

[57] ABSTRACT

Screen patterns for respective color components are represented by arrays of unit regions. The arrays for respective color components have a same array pitch and a same array orientation. Color component images are converted into color component halftone dot images through the screen patterns. When the density of the color component images is in a predetermined range, the color component halftone dot images have a plurality of linear dot elements in each unit region. The plurality of linear dot elements extend in a predetermined direction which is different for each color component.

15 Claims, 16 Drawing Sheets

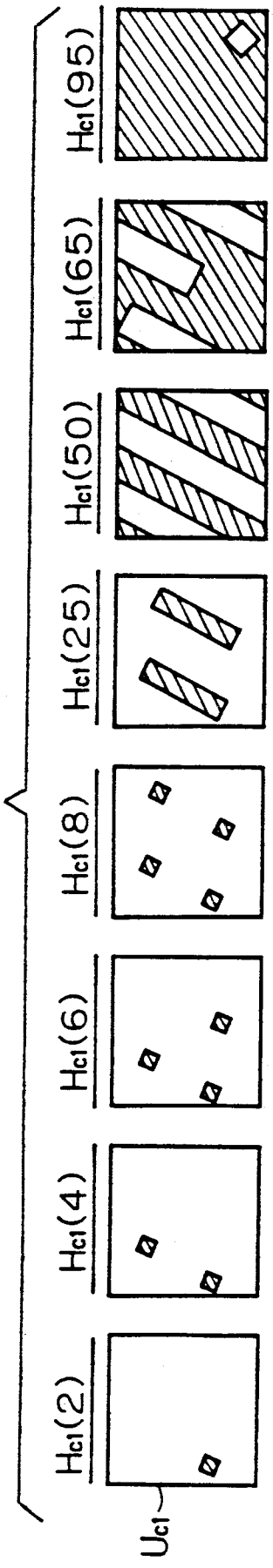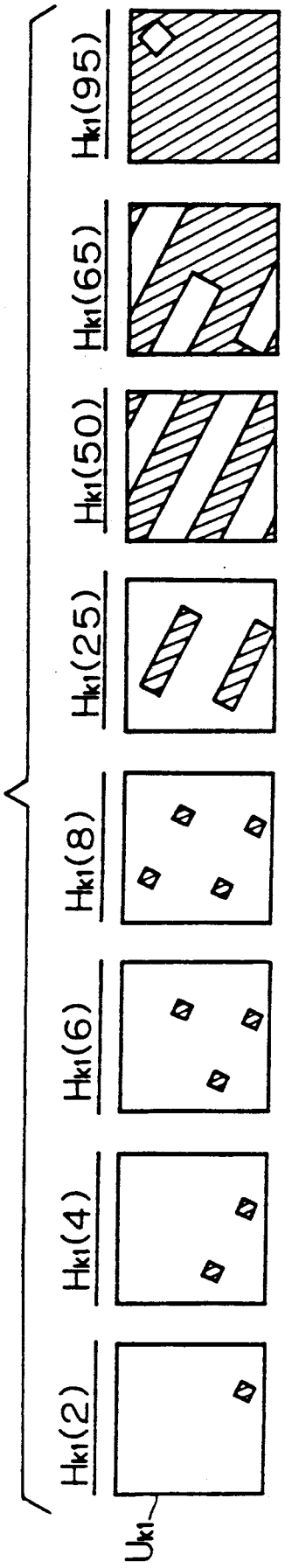

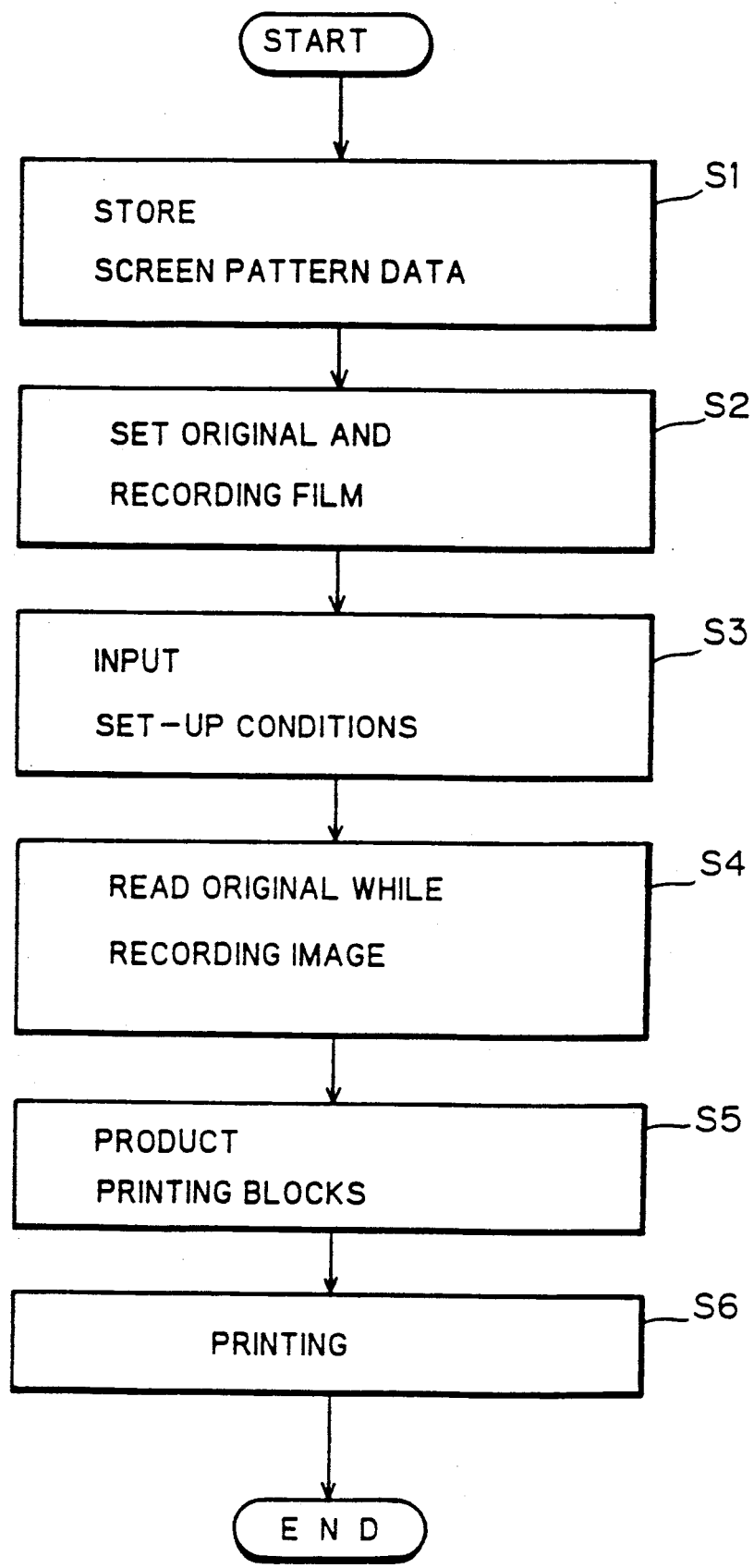

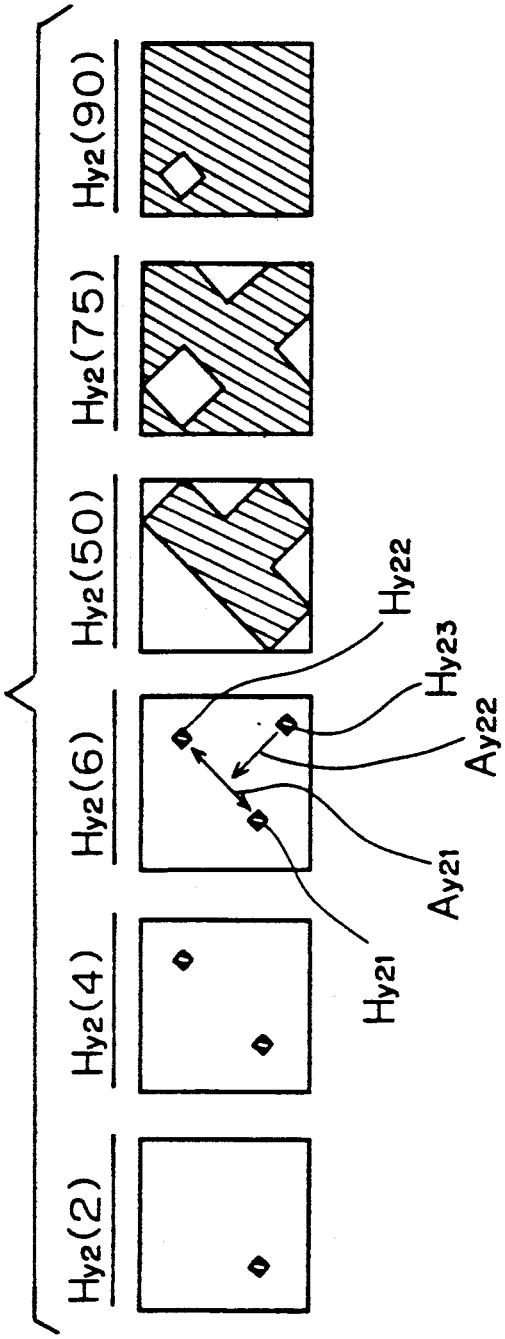
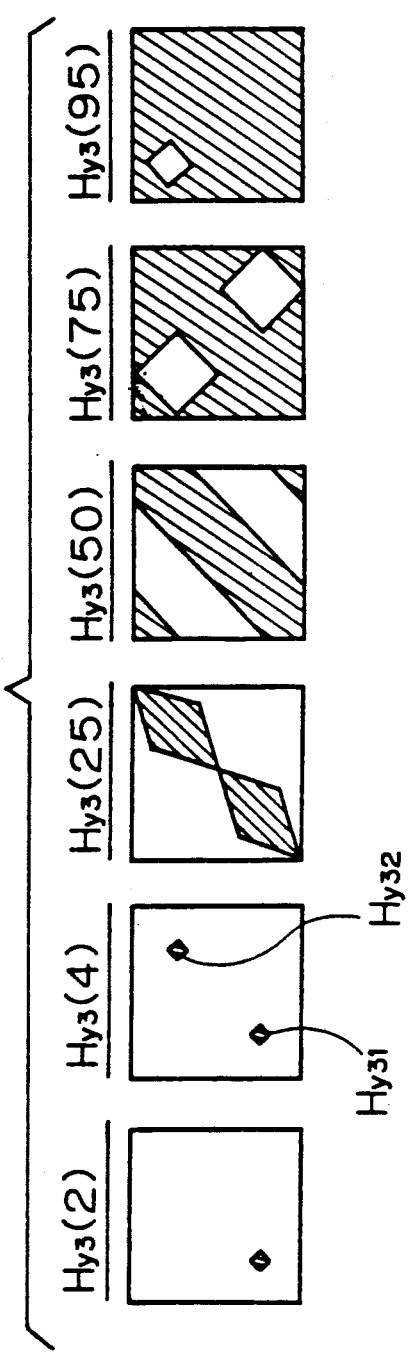
FIG. 9A
FIG. 9B

METHOD OF RECORDING HALFTONE DOT IMAGE

BACKGROUND OF THE INVENTION

1. Field of the Invention

The present invention relates to a method of recording halftone dot images and more particularly to improvement for obtaining halftone dot images having high resolution.

2. Description of Background Arts

It is known to increase a screen ruling (the array density of halftone dots per inch or that of single lines per inch) of halftone dot images in order to improve the resolution of printed matter for improving the readability of very small characters.

There is a problem in that the tone of printed matter having a screen ruling of 200 lines/inch or more is unstable. Generally, therefore the screen ruling cannot be increased beyond to 200 lines/inch or more, limiting the improve resolution.

Another method for improving the resolution of printed matter is the Bisutti method which is disclosed in Japanese Patent Publication No. 44-6404 and Japanese Utility Model Application Laid-Open No. 59-27546. In accordance with the method, two or more series of halftone dots with respectively different sizes are arranged regularly like a square lattice.

The halftone dot images according to Bisutti's method is appropriate for monochrome printing, but not for color printing. In the case of overprinting color-separated images for four colors in color printing, screen angles in the halftone dot images for respective color blocks are offset 30° apart, except for the yellow block which is offset by 15°, to avoid the occurrence of moire. In Bisutti's method, it is impossible to set the screen angles in the halftone dot images for the color blocks a (except for yellow a) to the 30°, value because one halftone dot image has substantially two screen angles different from each other by 45°.

On the other hand, minute annular patterns occur periodically due to the aforesaid differences in screen angle in the conventional methods of printing a plurality of halftone dot images imprinted on the same sheet and having different screen angles. The annular patterns are called a rosetta moire, which often occurs in a relatively large region on a printed sheet. The rosetta moire presents the problem that, although not usually noticed due to its minuteness, once it is noticed it deteriorates the quality of the image. When the screen angles in four color-separated images are set to the same value to prevent the rosetta moire from occurring, the rosetta moire does not occur, the problem of "color misplacement" is liable to occur due to color misregistration. That is, when the mutual positional relation of color-separated images on the printing sheet is slightly misplaced the visible tone of the printed matter changes, and some deviations in screen angles may cause a moire having a noticeably large pitch due to the repetition of such tone changes.

SUMMARY OF THE INVENTION

The present invention is directed to a method of recording a halftone dot color image on a recording medium.

According to the present invention, the method comprises the steps of: (a) separating an original image into a plurality of color component images; and (b) converting the plurality of color component images into a plurality of color component halftone dot images under a rule including the following conditions (b-1) through (b-5);

(b-1) the plurality of color component halftone dot images have respective arrays of unit regions defining cells in halftone dot representation: (b-2) the respective arrays of unit regions have a substantially same array pitch and substantially same orientation; (b-3) a plurality of core positions are defined in each unit region in the respective arrays; (b-4) a plurality of linear dot elements which have a substantially same area and which extend from the plurality of core positions along respective predetermined directions are obtained in the unit regions when a halftone dot area rate of a corresponding color component halftone dot image is in a predetermined range of dot area rate; and (b-5) the respective predetermined directions are different for each color component halftone dot image.

In the next step (c), the plurality of color component halftone dot images are overprinted on a recording medium to obtain a halftone dot color image on the recording medium.

Preferably, the rule further includes the following conditions (b-6) and (b-7):

(b-6) a plurality of linear blank elements which extend along respective predetermined directions are obtained in the unit regions when a halftone dot rate of a corresponding color component halftone dot image is in a predetermined range of dot area rate; (b-7) the respective predetermined second directions are different for each color component halftone dot image.

In an aspect of the present invention, the rule further includes the following condition (b-8):

(b-8) one or more dot cores are obtained at one or more positions included in the plurality of core positions when a halftone dot area rate of a corresponding color component halftone dot image is in another predetermined range of dot area rate.

The present invention is also directed to a color process scanner. According to the present invention, the scanner comprises: (a) means for reading an original image and for generating color component signals representing the original image for each color component; (b) means for generating screen pattern signals representing predetermined threshold levels for each color component; (c) means for comparing the color component signals with the screen pattern signals for each color component and for each pixel to generate halftone dot signals for respective color components; (d) means for modulating a light in accordance with the halftone dot signals for respective color components and for each pixel; and (e) means for relatively moving the light and a photosensitive film so that the light scans the photosensitive film to record color component halftone images on the recording film.

The scanner is characterized in that the means (b) includes; means for generating the screen pattern signals under a rule including the following conditions (b-1) through (b-3):

(b-1) the threshold levels are assigned to respective pixels in a matrix pixel array for each color component, the matrix pixel array has a same array size and a same orientation for all color components; (b-2) a distribution of the threshold levels in the matrix pixel array includes a plurality of valleys extending along a predetermined direction for each color component; and (b-3) the predetermined direction is different for each color component. Preferably, a plurality of isolated bottoms are provided in each valley.

A "halftone dot" the designates a minute dot shape and size of which are variable according to the density of an image having gradation to be reproduced. In the conventional methods, there is one halftone dot in a repetition unit region. In the present invention, however, since there are a plurality of minute dots in the repetition unit region, the individual minute dots are referred to as "halftone dot components" and the whole set of halftone dot components in one repetition unit region as a "halftone dot".

The "unit region" or a "repetition unit region" of the halftone dot designates the minimum repetition region which appears in the repetition patterns formed by the halftone dots in the case of forming the halftone dot at a constant halftone dot area rate.

The "dot core" or a "halftone dot forming core" designates the point which forms a core from which the halftone dot components grow according to the halftone dot area rate.

"Screen" signifies a reticulate lattice comprising two crossing sets of periodical parallel lines which link the centers of the repetition unit regions of the halftone dots. The reticulate lattice may be not only rectangular but may also have a parallelogram shape.

A "screen pitch" signifies each length of two adjacent sides of the parallelogram, and a "screen angle" signifies the angle formed by each of two adjacent sides of the parallelogram with a horizontal line, generally measured for corresponding one side of a parallelogram (normally a square) in each block. The screen pitch corresponds to the array pitch of the repetition unit region and the screen angle to the array orientation or the array angle thereof.

The same array pitch and array angle in the repetition unit region are set in common to halftone dot images for all color components, thereby the unit region of the repetition patterns is almost the same size as one halftone dot in a reproduced image to be produced on the basis of the halftone dot images for respective color components. Therefore, large-scale repetition patterns which cause the rosetta pattern are not generated.

Besides, the halftone dot recorded shape is formed as a collection of the linear elements extending in a predetermined extension direction, which is different in the halftone dot images for respective color components. Hence, this construction prevents the area of the overlapping portion of halftone dot recorded shapes for respective color components due to being out of register from changing extremely, thereby generating no color misplacement.

Furthermore, a plurality of halftone dot forming cores are defined in the repetition unit region of the halftone dot. In the first range of halftone dot area rates, the halftone dot recorded shape is defined to comprise a plurality of linear shapes extending from the respective halftone dot forming cores. Therefore, in this range, the screen ruling substantially increases and the resolution is improved.

When the shape of the blank element or a blank region which is other region than the halftone dot recorded shape in a repetition unit region is defined to comprise a plurality of linear shapes in the second range of halftone dot area rates, the screen ruling substantially increases and the resolution is improved also in the second range of halftone dot area rates.

Accordingly, an object of the present invention is to provide a method of recording halftone dot images capable of obtaining printed matters having high resolution while preventing color misplacement and rosetta moire from occurring.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 4A-4D, 5A, 5B, 9A, 9B and 10A-10C are explanatory diagrams showing the changes of halftone dot recorded shapes;

FIG. 8 is a flow chart showing the procedure of the preferred embodiment.

DESCRIPTION OF THE PREFERRED EMBODIMENT

A. Fundamental Conception

Figure 1A:
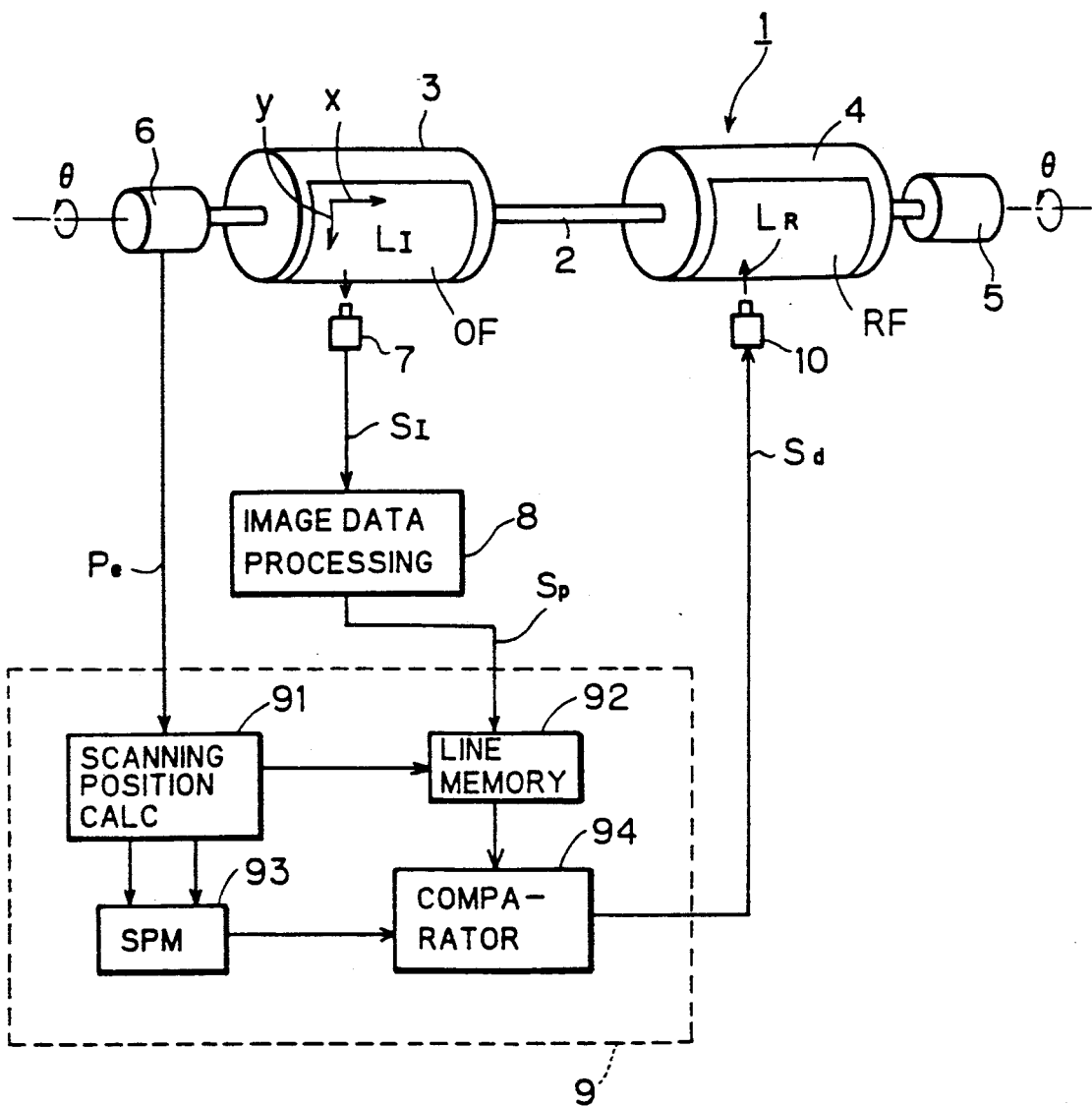
FIGS. 1A and 1B are block diagrams showing the construction of a device in which a method according to a preferred embodiment of the present invention is conducted.

If a plurality of halftone dot forming cores are provided in a repetition unit region of a halftone dot, the resolution of printed matters can be improved as in Bisutti's method. In color printing, however, the following improvements are necessary to prevent rosetta moire and color misplacement from occurring.

In conventional color printing, a plurality of halftone dot images for respective color components are composed of screen structures having respectively different screen angles (for example, 0°, 15°, 45° and 75°). Overlapping of the three color component images whose screen angles differ from each other by every 30°, periodic, annular patterns (rosetta moire) occur. However, when a same screen angle is given to respective color component images, the occurrence of the rosetta moire is prevented.

But, when the screen angles and screen pitches of the respective color component images are equalized and the halftone dot recorded shapes thereof are also equalized, color misplacement occurs in the case where the mutual positional relation between the respective color component images is shifted on a printing sheet. As an example of the "color misplacement", in producing a grey printed region by overprinting three colors, yellow, magenta and cyan, the whole printed region becomes yellowish when the yellow block is slightly out of register and yellow ink is printed on a portion which is partially or fully deviated from the portion on which magenta and cyan are overprinted, that is, when the area on which yellow is overprinted with the other colors is reduced.

When, in addition to equalizing the screen angles and screen pitches of the respective color component images, each halftone dot recorded shape is defined as a set of straight segments or lines extending in a predetermined direction and the extension directions of the linear halftone dot components are defined to be different in respective color component images, the area on which respective color inks are overprinted is smaller than that in the aforementioned case. Even if the area of the overlapping portion may change due to being out of register, the amount of change thereof is relatively small. Therefore, the color misplacement as above-mentioned is preventable.

Furthermore, when the linear halftone dot components are formed so as to extend from a plurality of halftone dot forming cores, the resolution of printed matters is improved.

B. Construction of Halftone Dot

FIGS. 3A-3F are explanatory diagrams showing the construction of halftone dots according to a preferred embodiment of the present invention. FIGS. 3A-3D illustrate corresponding parts of halftone dot images $I_{y1}$, $I_{m1}$, $I_{c1}$ and $I_{k1}$ for color components of yellow (Y), magenta (M), cyan (C) and black (K) in four color printing, which have the halftone dot area rates about 25%.

The halftone dot images or color component images $I_{y1}$, $I_{m1}$, $I_{c1}$ and $I_{k1}$ have repetition unit regions $U_{y1}$, $U_{m1}$, $U_{c1}$ and $U_{k1}$ which are unit cells in halftone dot representation and are equal squares. One repetition unit region $U_{y1}$ includes two halftone dot components $Ha_{y1}$ and $Hb_{y1}$. The same is true for the other repetition unit regions $U_{m1}$, $U_{c1}$ and $U_{k1}$. The halftone dot components in the respective halftone dot images $I_{y1}$, $I_{m1}$, $I_{c1}$ and $I_{k1}$ have elongated and linear recorded shapes along the respectively specified directions (hereinafter referred to as "extension directions" $A_{y1}$, $A_{m1}$, $A_{c1}$ and $A_{k1}$.

A screen angle is conventionally defined as the smaller of two angles taken counterclockwise between two lattice axes $S1_{y1}$ and $S2_{y1}$ and the horizontal line in the halftone dot lattice structure formed by halftone dot centers $O_{y1}$, for example. On the other hand, in the present invention, the screen angle is defined as "the smallest of a plurality of angles taken counterclockwise from a main scanning direction y to the directions of a plurality of lattice axes specifying the halftone dot lattice structure". Accordingly, all screen angles are zero in the halftone dot images $I_{y1}-I_{k1}$ shown in FIGS. 3A-3D. Furthermore, because the angles between the first lattice axes $S1_{y1}-S1_{k1}$ and the second lattice axes $S2_{y1}-S2_{k1}$ are equal, the screen angle can be defined on the basis of either the aforementioned first or second lattice axes. "The sameness in array orientations or screen angle" in the present invention means that the angles between the first lattice axes $S1_{y1}-S1_{k1}$ and the second lattice axes $S2_{y1}-S2_{k1}$ are equal with each other in the respective halftone dot images $I_{y1}-I_{k1}$ and the screen angles defined according to a predetermined rule common to the respective halftone dot images $I_{y1}-I_{k1}$ are equal to each other.

On the other hand, distances $P1_{y1}-P1_{k1}$ between the halftone dot centers along the first lattice axes $S1_{y1}-S1_{k1}$ are defined as first screen pitches and distances $P2_{y1}-P2_{k1}$ between the halftone dot centers along the second lattice axes $S2_{y1}-S2_{k1}$ as second screen pitches. In the example shown in FIGS. 3A-3D, the screen pitches are equal and following equations are satisfied:

$$P1_{y1} = P1_{m1} = P1_{c1} = P1_{k1} = K_1 \tag{1}$$

$$P2_{y1} = P2_{m1} = P2_{c1} = P2_{k1} = K_2 \tag{2}$$

$$K_1 = K_2 \tag{3}$$

where, $K_1$ and $K_2$ are the constants representing the values of the first and second screen pitches, respectively.

Furthermore, the halftone dot images $I_{y1}-I_{k1}$ are characterized in that the extension directions $A_{y1}-A_{k1}$ of the halftone dot components are different from each other. The extension directions $A_{y1}-A_{k1}$ are oriented in the directions of 120°, 30°, 150° and 60° respectively with respect to the main scanning direction y.

Figure 3A:
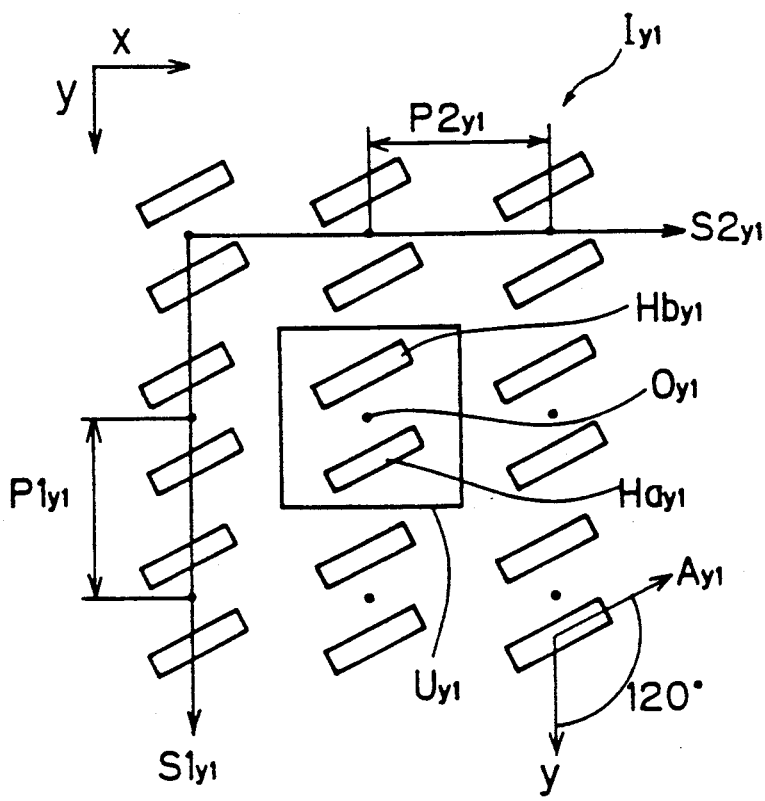
FIGS. 3A-3F are explanatory diagrams showing the construction of halftone dots according to the preferred embodiment of the present invention.
Figure 3B:
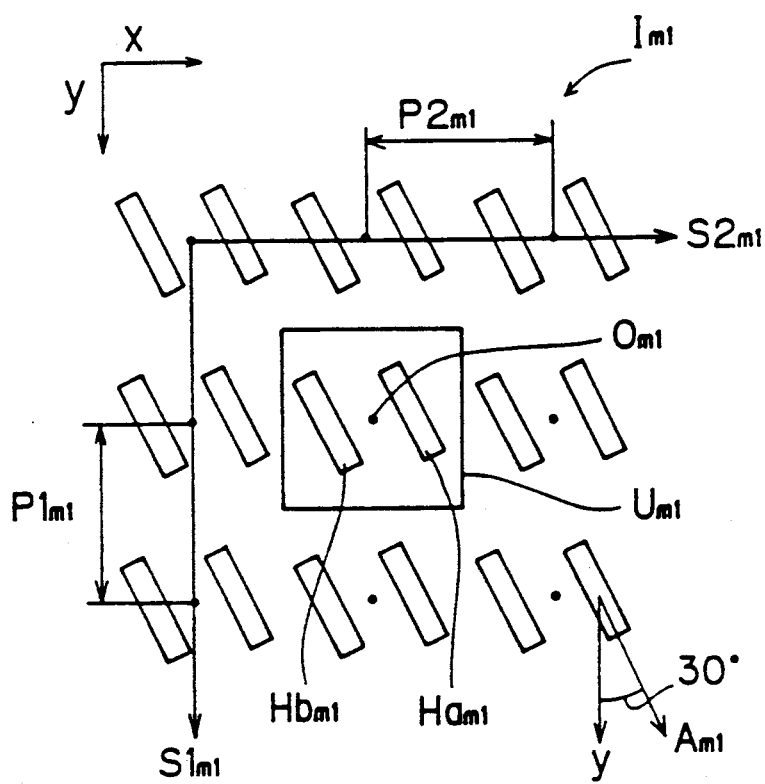
Figure 3C:
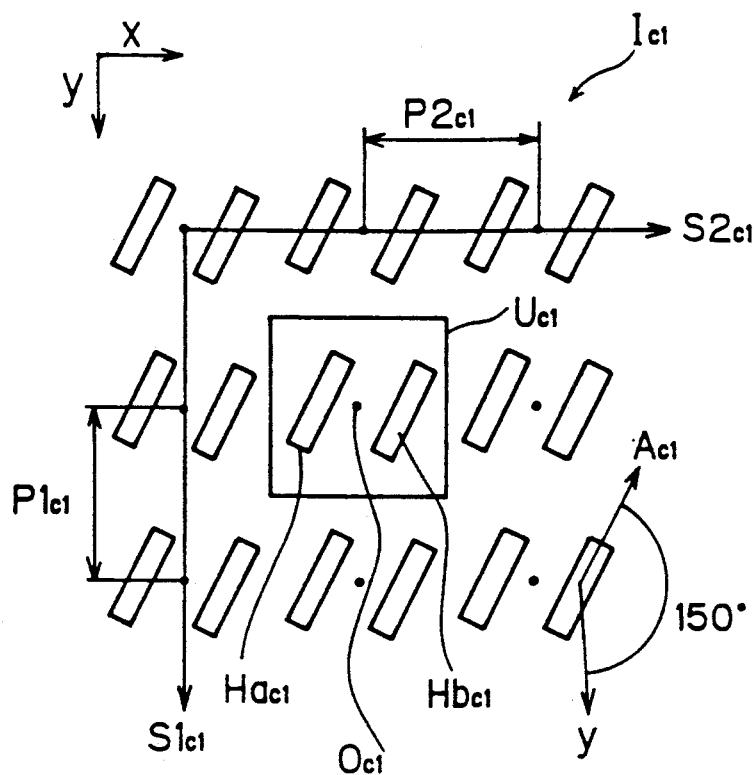
Figure 3D:
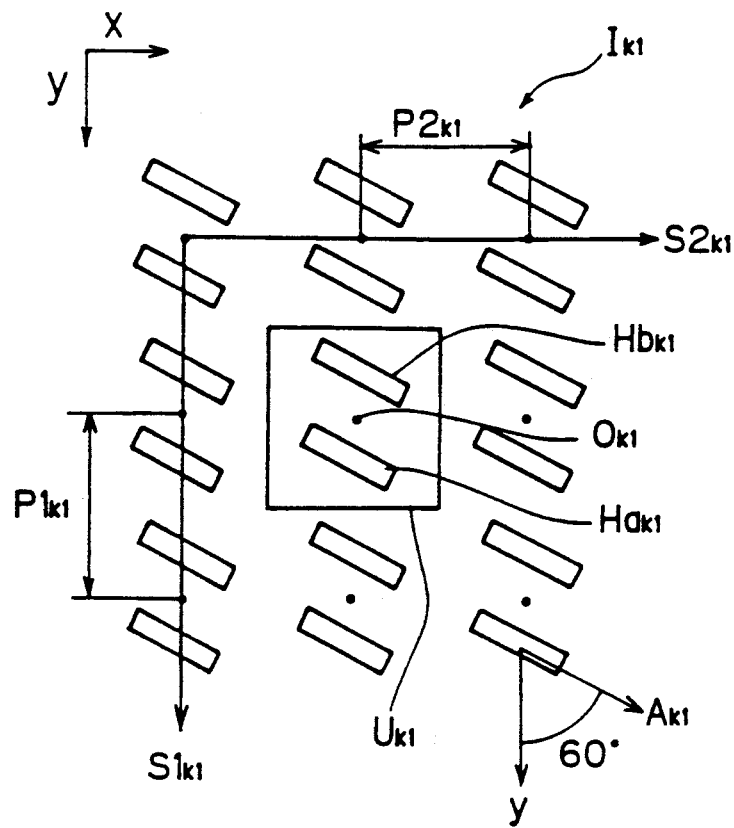
Figure 3E:
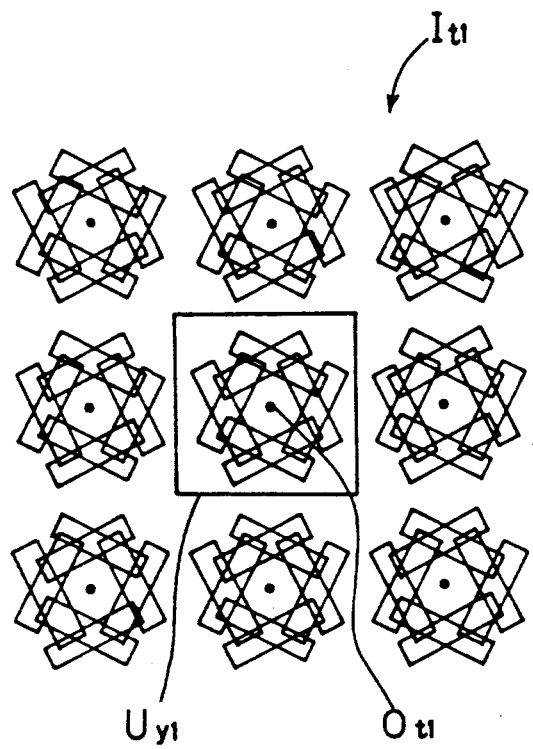

When the halftone dot images $I_{y1}-I_{k1}$ are overprinted on a sheet with respective color inks, a reproduced image $I_{t1}$ having the halftone dot construction shown in FIG. 3E is obtained. The reproduced image $I_{t1}$ shows the case where the halftone dot centers $O_{y1}-O_{k1}$ of the respective halftone dot images $I_{y1}-I_{k1}$ coincide at the same point $O_{t1}$ on the image plane. Since the extension directions $A_{y1}-A_{k1}$ of the halftone dot components differ from one another, the overlapping region of respective colors is small. Hence, even if it is out of register, the area of the overlapping region does not change so much and the color misplacement is not liable to occur during printing. Besides, since the reproduced image $I_{t1}$ is formed by minimum repetition patterns wherein a square repetition unit region $U_{y1}$ is a unit, the rosetta moire does not occur.

Figure 3F:
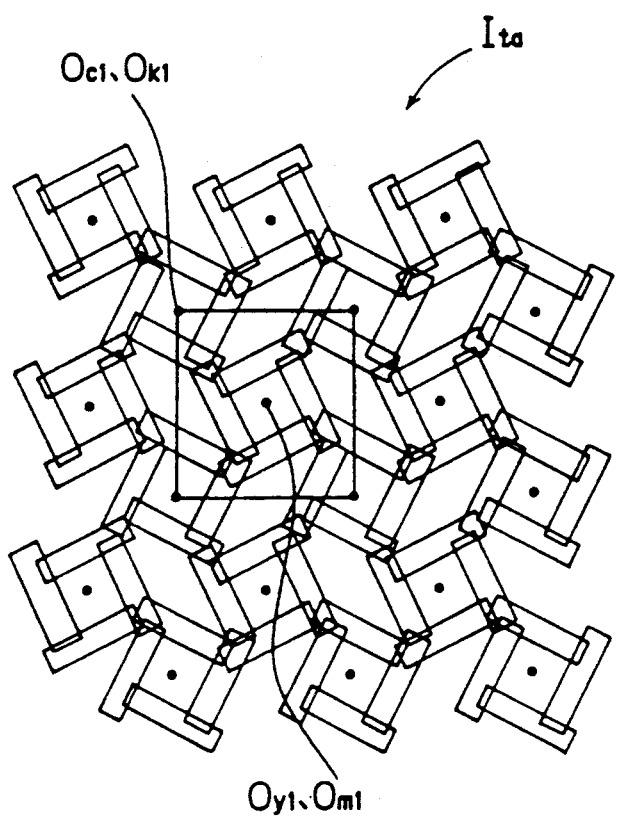
Figure 4A:
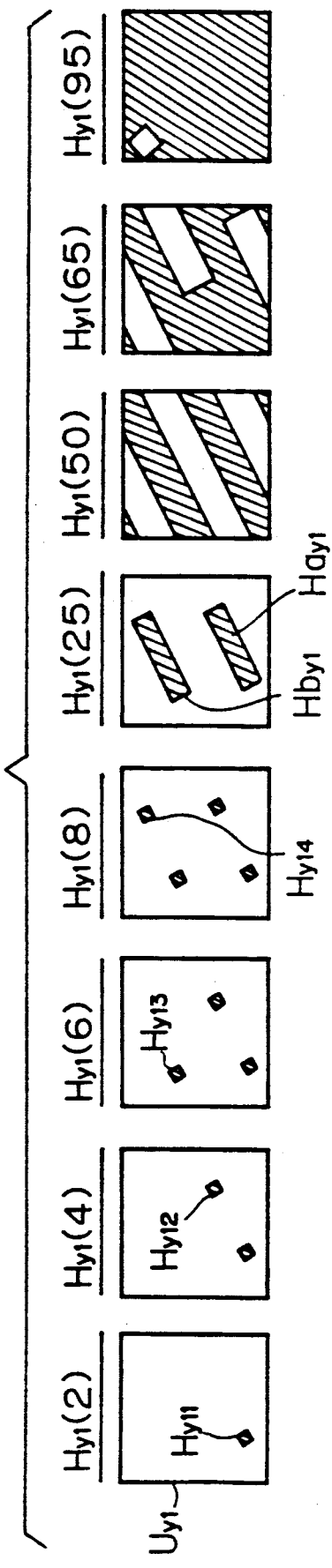
Figure 4B:
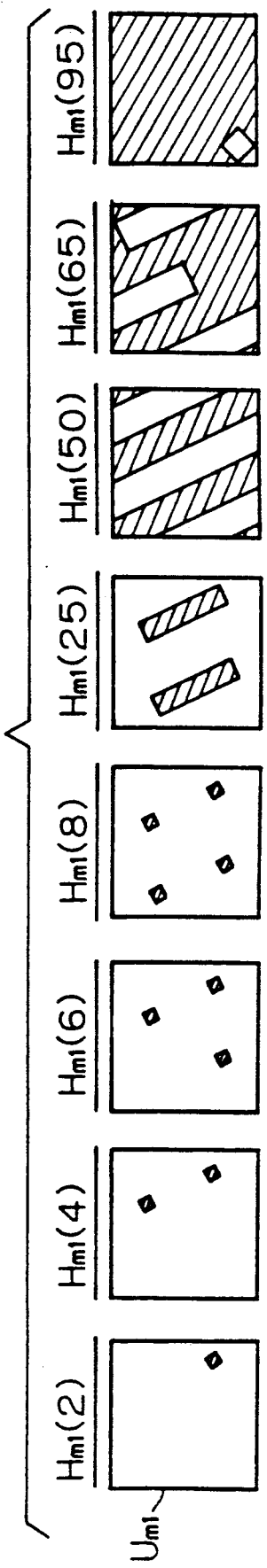

In FIG. 3E, the halftone dot centers $O_{y1}-O_{k1}$ of the respective halftone dot images $I_{y1}-I_{k1}$ coincide at a point $O_{t1}$ on the reproduced image $I_{t1}$. However, they may be defined at respectively different positions. FIG. 3F shows a reproduced image and the halftone dot construction thereof in a case where the respective halftone dot centers $O_{y1}-O_{k1}$ do not coincide. In the reproduced image $I_{ta}$ shown in FIG. 3F, for example, a group of the halftone dot centers $O_{y1}$ and $O_{m1}$ is defined at a different position from a group of the halftone dot centers $O_{c1}$ and $O_{k1}$.

In the cases of FIGS. 3A-3F, all screen angles and screen pitches in the halftone dot images $I_{y1}-I_{k1}$ for respective colors, Y, M, C and K, are set to the same. Since three colors, M, C and K, are particularly important to the occurrence of the rosetta moire, the halftone dot image $I_{y1}$ for Y (yellow) may be constructed in accordance with the halftone dot structure different from those for the colors, M, C and K. It is possible, for example, to set only the screen angle of the halftone dot image $I_{y1}$ to 15° or 30°. In such construction, large and small overlaps of the yellow halftone dot $H_{y1}$ wi the other halftone dots $H_{m1}$, $H_{c1}$, $H_{k1}$ are evenly distributed over the entire image region, thereby being effective to prevent the color misplacement.

C. Change of Halftone Dot Shape and Characteristics thereof

FIGS. 4A-4D show the changing processes of the recorded shapes of the halftone dot images $I_{y1}$, $I_{m1}$, $I_{c1}$ and $I_{k1}$ in accordance with the halftone dot area rates. FIGS. 4A-4D illustrate the recorded shapes of the halftone dots $H_{y1}$, $H_{m1}$, $H_{c1}$ and $H_{k1}$ in the repetition unit regions $U_{y1}$, $U_{m1}$, $U_{c1}$ and $U_{k1}$, respectively. In addition, the halftone dot $H_{y1}$ with the halftone dot area rate r% is expressed as $H_{y1}(r)$. The halftone dot components comprising the halftone dots $H_{y1}$, $H_{m1}$, $H_{c1}$ and $H_{k1}$ are hatched with oblique lines.

When the halftone dot area rate r is 2% or less, the halftone dot $H_{y1}(r)$ is composed of only one halftone dot components $H_{y11}$. Such an initial and minute halftone dot component is in particular referred to as a "halftone dot forming core". When the halftone dot area rate r is between 2-4%, it is composed of two halftone dot forming cores $H_{y11}$ and $H_{y12}$; when 4-6%, three halftone dot forming cores $H_{y11}$-$H_{y13}$; and when 6-8%, four halftone dot forming cores $H_{y11}$-$H_{y14}$.

When the halftone dot area rate r is 8% or more, the halftone dot components extend from the respective halftone dot forming cores $H_{y11}$-$H_{y14}$ in the extension direction $A_{y1}$ (see FIG. 3A). When the halftone dot area rate r is 25%, two halftone dot components which have grown from two halftone dot forming cores $H_{y11}$ and $H_{y12}$ respectively are connected to each other to form one halftone dot component $Ha_{y1}$. Two halftone dot components which have grown from two other halftone dot forming cores $H_{y13}$ and $H_{y14}$ respectively are also connected to each other to form one halftone dot component $Hb_{y1}$. As a result, the halftone dot $H_{y1}(25)$ is composed of two halftone dot components $Ha_{y1}$ and $Hb_{y1}$.

The order of the arrangement of new halftone dot forming cores before the halftone dot area rate r reaches 8% is not limited to $H_{y11} \rightarrow H_{y12} \rightarrow H_{y13} \rightarrow H_{y14}$ as shown in the figure. It is arbitrarily definable such as $H_{y13} \rightarrow H_{y12} \rightarrow H_{y11} \rightarrow H_{y14}$. Likewise, the order of the halftone dot forming cores from which the halftone dots are grown is arbitrarily definable, when the halftone dot area rate is between 8-25%. The same is true for the range of the halftone dot area rate between 50-95 or 100% as described later.

Figure 5A:
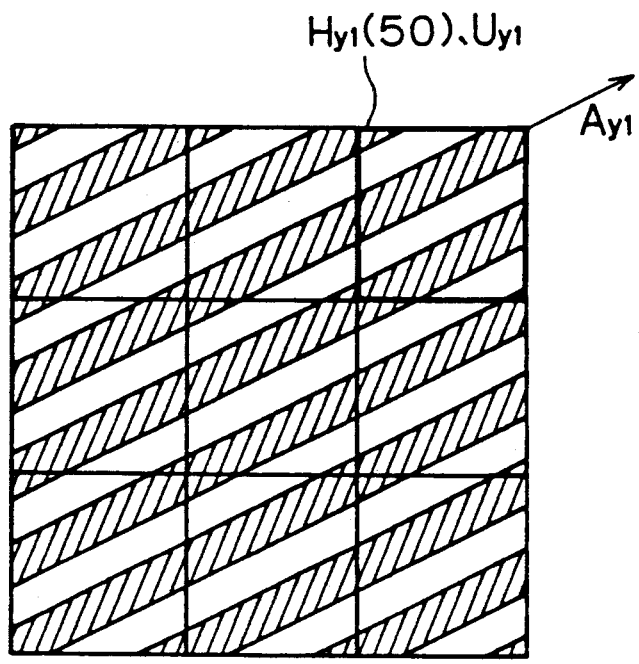

Even when the halftone dot area rate is 25% or more, the halftone dot components $Ha_{y1}$ and $Hb_{y1}$ continue to extend along the extension direction $A_{y1}$, so that they are connected to the halftone dot components of the adjacent halftone dots to form parallel lines equally spaced. Subsequently, the width of the halftone dot components grows until the halftone dot area rate r reaches 50%. FIG. 5A shows 3×3 array of the halftone dot $H_{y1}(50)$ in the case where the halftone dot area rate r is 50%. The halftone dot components in the adjacent halftone dots are connected to each other along the extension direction $A_{y1}$, thereby forming a set of periodical parallel lines or a stripe pattern equally spaced. At this time, the halftone dot components and blank components (other portions than the halftone dot components) have the same in width.

Figure 5B:
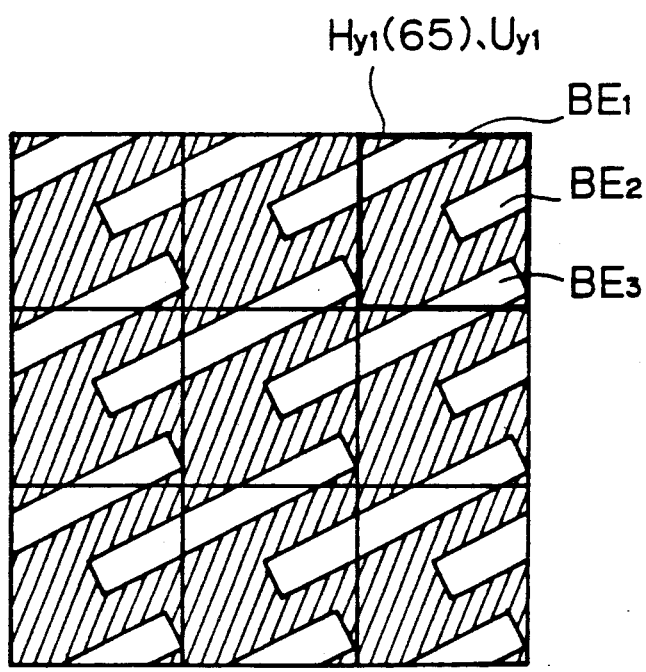

When the halftone dot area rate r is 50% or more, the halftone dot components spread partially, so that the parallel lines are partially connected with each other and they separate the blank components which have been connected together. FIG. 5B shows 3×3 array of the halftone dots $H_{y1}(65)$ in the case where the halftone dot area rate r is 65%. Each halftone dot $H_{y1}(65)$ has three blank components $BE_1$-$BE_3$. The blank components in the adjacent halftone dots are connected to each other and form respectively independent and insular blank regions. In the range of the halftone dot area rate r between 50-95%, the length of the independent and blank regions is gradually decreased and then the blank components disappear one by one.

When the halftone dot area rate r is 95%, the halftone dot $H_{y1}(r)$ has only one blank component. At the halftone dot area rate r of 95% or more, the blank component becomes smaller gradually. When the halftone dot area rate r reaches 100%, the repetition unit region $U_{y1}$ is fully occupied by the halftone dot components.

The second halftone dot $H_{m1}(r)$ is given by rotating the first halftone dot $H_{y1}(r)$ by 90° counterclockwise; the third halftone dot $H_{c1}(r)$ by turning over the second halftone dot $H_{m1}(r)$; and the fourth halftone dot $H_{k1}(r)$ by rotating the third halftone dot $H_{c1}(r)$ by 90° counterclockwise.

Figure 6A:
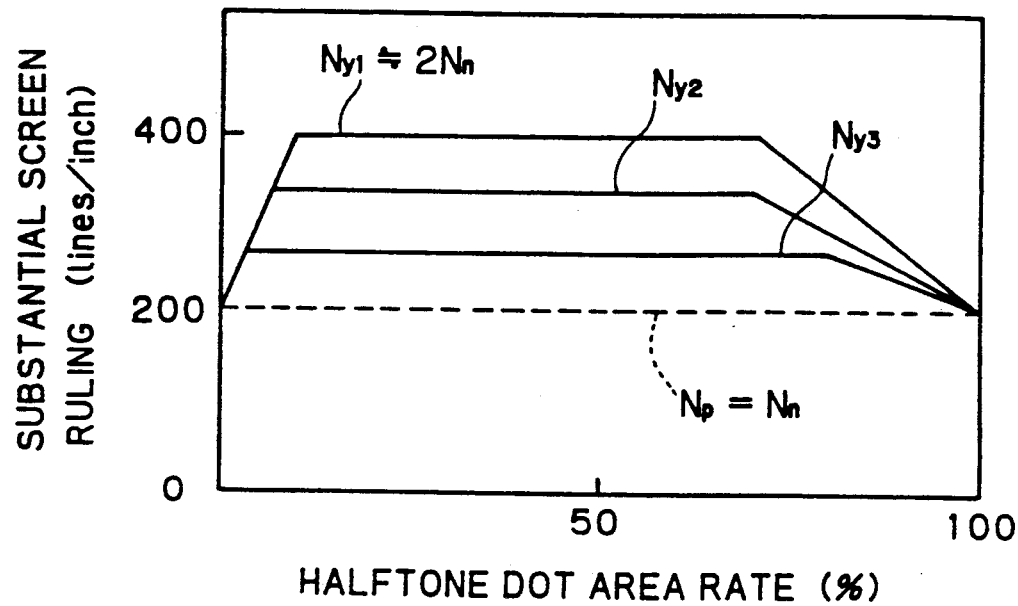
FIG. 6A shows the changes of a substantial screen ruling in relation to halftone dot area rates.

FIG. 6A is a conceptional diagram showing a substantial screen ruling of the halftone dot image in relation to the halftone dot area rate. The substantial screen ruling N is defined as follows:

[substantial screen ruling N] = [number of parallel lines per inch] = [inverse of interval (inch) of parallel lines]     (4)

As contrasted with the substantial screen ruling, a nominal screen ruling is defined as follows:

[nominal screen ruling] = [array number of halftone dots per inch] = [inverse of screen pitch (inc)]     (5)

First, in FIG. 6A, comparison is made between the substantial screen ruling $N_p$ of the conventional halftone dot image and that $N_{y1}$ of the halftone dot image $I_{y1}$. The conventional halftone dot is composed of only one halftone dot component over the entire range of the halftone dot area rates r. FIG. 6A shows the comparison of the substantial screen rulings of the halftone dot images having the same nominal screen ruling $N_n$. The substantial screen ruling $N_p$ of the conventional halftone dot image is constant in relation to the halftone dot area rate r and equal to the nominal screen ruling $N_n$. On the other hand, the substantial screen ruling $N_{y1}$ of the halftone dot image $I_{y1}$ increases each time the halftone dot forming cores $H_{y11}$-$H_{y14}$ shown in FIG. 4A increase one by one. When the halftone dot area rate is about 8%, the substantial screen ruling $N_{y1}$ is about twice the number of the nominal screen ruling $N_n$. Since the increase of the substantial screen ruling results in the improvement of the resolution of printed matters, the resolution of the halftone dot image $I_{y1}$ is higher than that of the conventional halftone dot.

When the halftone dot area rate is 50% or more, the blank regions are formed in an independent and insular shape as shown in FIG. 5B. As a result, the substantial screen ruling $N_{y1}$ decreases as the halftone dot area rate increases.

When the halftone dot area rate is about 95 or more, the substantial screen ruling $N_{y1}$ coincides with the nominal screen ruling $N_n$. This is because the halftone dot $H_{y1}(95)$ (See FIG. 4A.) becomes equivalent to the conventional halftone dot (square dot), that is, because the halftone dot $H_{y1}(95)$ has only one approximately square blank component.

Figure 6B:
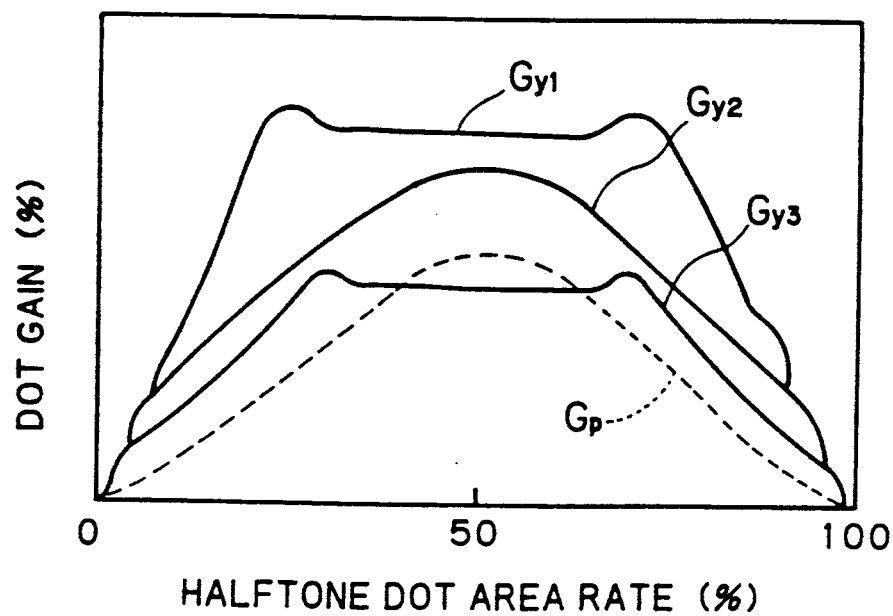
FIG. 6B shows the changes of a dot gain amount in relation to halftone dot area rates.

FIG. 6B is a conceptional diagram showing a dot gain in relation to the halftone dot area rate. The dot gain G (%) is given as follows:

G = (halftone dot area rate on printed matters) − (halftone dot area rate on halftone dot film)     (6)

Where, a "halftone dot film" designates a film on which the halftone dots are recorded. When print is made by the use of a printing block which is obtained from the halftone dot film, the halftone dot area rate on the printed matters is higher than that on the halftone dot film. This results from the fact that ink is pressed against the printing paper to spread. Generally, the dot gain depends on the total amount of boundary line lengths (hereinafter referred to as a boundary length) between the halftone dot components and the blank components.

In FIG. 6B, the dot gain $G_{y1}$ of the halftone dot image $I_{y1}$ approaches $G_p$ of the conventional halftone dot image in ranges of the halftone dot area rates around 0% and 100%. This is because the substantial screen ruling $N_{y1}$ of the halftone dot image $I_{y1}$ approaches the screen ruling $N_p$ of the conventional halftone dot image in thereby respective boundary lengths of the both halftone dot images are approximate to each other.

On the other hand, when the halftone dot area rate is around 50%, the dot gain $G_{y1}$ of the halftone dot image $I_{y1}$ is about twice the amount of $G_p$ of the conventional halftone dot image. This corresponds to the relation between the substantial screen rulings $N_{y1}$ and $N_p$ shown in FIG. 6A.

The conventional halftone dot images have a problem that tone jump occurs at the halftone dot area rate approximate to 100% when the screen ruling increases. The tone jump is a phenomenon associated with sharp changes of a tone. The tone jump occurs because large dot gain causes all-over painting on the printed matters in spite of the presence of blank regions on the halftone dot film. As for the halftone dot image $I_{y1}$ in the preferred embodiment, however, the dot gain $G_{y1}$ is held at a small value in a range of the halftone dot area rate approximate to 100% as compared with the range around 50%, thereby the tone jump is not liable to occur.

The conventional halftone dot images have another problem that, when the screen ruling increases, the halftone dot components become too small at a low area rate (for example, 2%) to be reproduced on the printing paper; that is a problem which ensues from the rise of a minimum printing density. This is because the repetition unit region of the halftone dot becomes smaller in inverse proportion to the increase of the screen ruling so that the magnitude of 2% of the repetition unit region is diminished extremely. On the other hand, as for the halftone dot image $I_{y1}$ in this preferred embodiment, the repetition unit region $U_{y1}$ is not diminished and the halftone dot forming cores $H_{y11}$–$H_{y14}$ are held around 2% in halftone dot area rate in the case of the nominal screen ruling of 200 lines/inch, so that the respective halftone dot forming cores can be reproduced on the printing paper. Therefore, there is also an advantage of maintaining the minimum printing density around 2%.

D. Schematic Construction and Operation of Device

FIG. 1A is a block diagram showing the schematic construction of a color process scanner according to the preferred embodiment of the present invention. A color scanner I is provided with an input drum 3 and an output drum 4 both of which are fixed to a common shaft 2. An original film OF is wound around the input drum 3, and a recording film RF around the output drum 4. A motor 5 is provided at one end of the shaft 2, and a rotary encoder 6 at the other end thereof.

In reading the original OF and recording images on the recording film RF, the motor 5 rotates the shaft 2, the input drum 3 and the output drum 4 in a direction $\theta$ at constant speed. Incident light $L_1$ from a light source (not shown) such as a halogen lamp which is provided inside the input drum 3 passes through the transparent input drum 3 and the original OF and is read by an input head 7.

The input head 7 moves in a subscanning direction x at a constant and relatively low speed. Hence, the original OF is read in order of scanning lines along a main scanning direction y, which is in the circumferential direction of the input drum 3. The input head 7 separates the respective color components in the incident light $L_I$ and generates a plurality of color separation input signals $S_I$ corresponding respectively to color elements of red (R), green (G) and blue (B). The color separation input signals $S_I$ are inputted to a image data processing circuit 8 to be converted into printing density signals $S_p$ ($S_{py}$, $S_{pm}$, $S_{pc}$, $S_{pk}$) corresponding respectively to ink of four colors, Y, M, C and K, as well as to execute processings such as color correction. The printing density signals $S_p$ are inputted to halftone converter 9 and converted into a halftone dot signal $S_d$ for forming the halftone dot with minute dots, which is given to a recording head 10. Based on the halftone dot signal $S_d$, the recording head 10 exposes the recording film RF with laser light $L_R$ and records the halftone dot image thereon.

Figure 2:
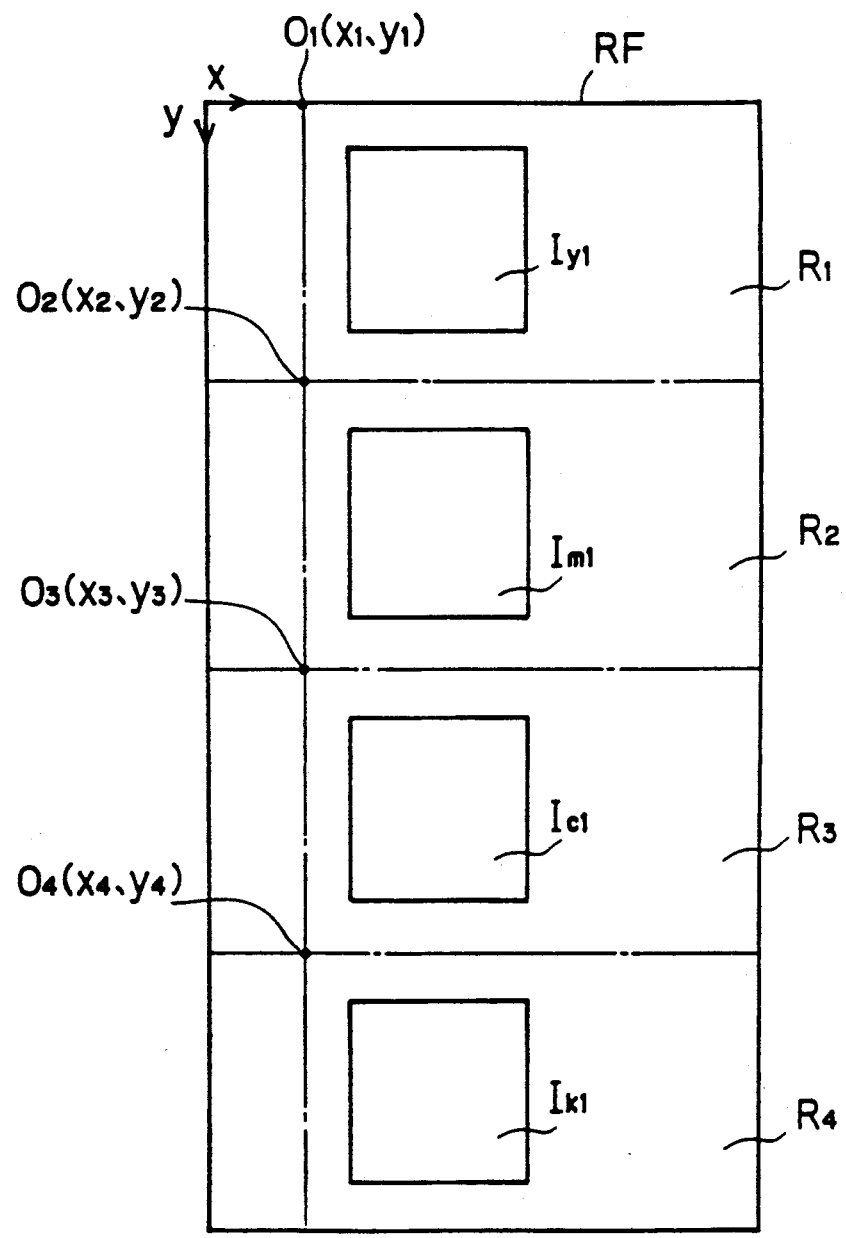
FIG. 2 is a conceptional diagram showing halftone dot images on a recording film.

FIG. 2 is an explanatory diagram showing an example of the halftone dot images recorded on the recording film RF. The halftone dot images $I_{y1}$, $I_{m1}$, $I_{c1}$ and $I_{k1}$ corresponding to each color element Y, M, C and K, are recorded on one recording film RF. An array order of the halftone dot images $I_{y1}$, $I_{m1}$, $I_{c1}$ and $I_{k1}$ is arbitrarily changeable.

The halftone converter 9 is a circuit for generating a halftone dot signal $S_d$ which produces the halftone dot images $I_{y1}$, $I_{m1}$, $I_{c1}$ and $I_{k1}$ shown in FIGS. 3A–3D on one recording film RF, and comprises a scanning position calculation circuit 91, a line memory 92, a screen pattern memory portion (hereinafter referred to as a SPM portion) 93 and a comparator 94. The scanning position calculation circuit 91 and the SPM portion 93 function as screen pattern data generating means for generating screen pattern data for every pixel in synchronism with the printing density signals $S_p$. The comparator 94 functions as halftone dot signal generating means for generating the halftone dot signal $S_d$ which is a halftone dot recording signal. The line memory 92 is operable to store the printing density signals $S_p$ for respective dots in each scanning line, according to a scanning order. In an example shown in FIG. 2 the printing density signals for four colors, Y, M, C and K, of the original image are written in this order to the memory positions corresponding to regions $R_1$–$R_4$.

Figure 1B:
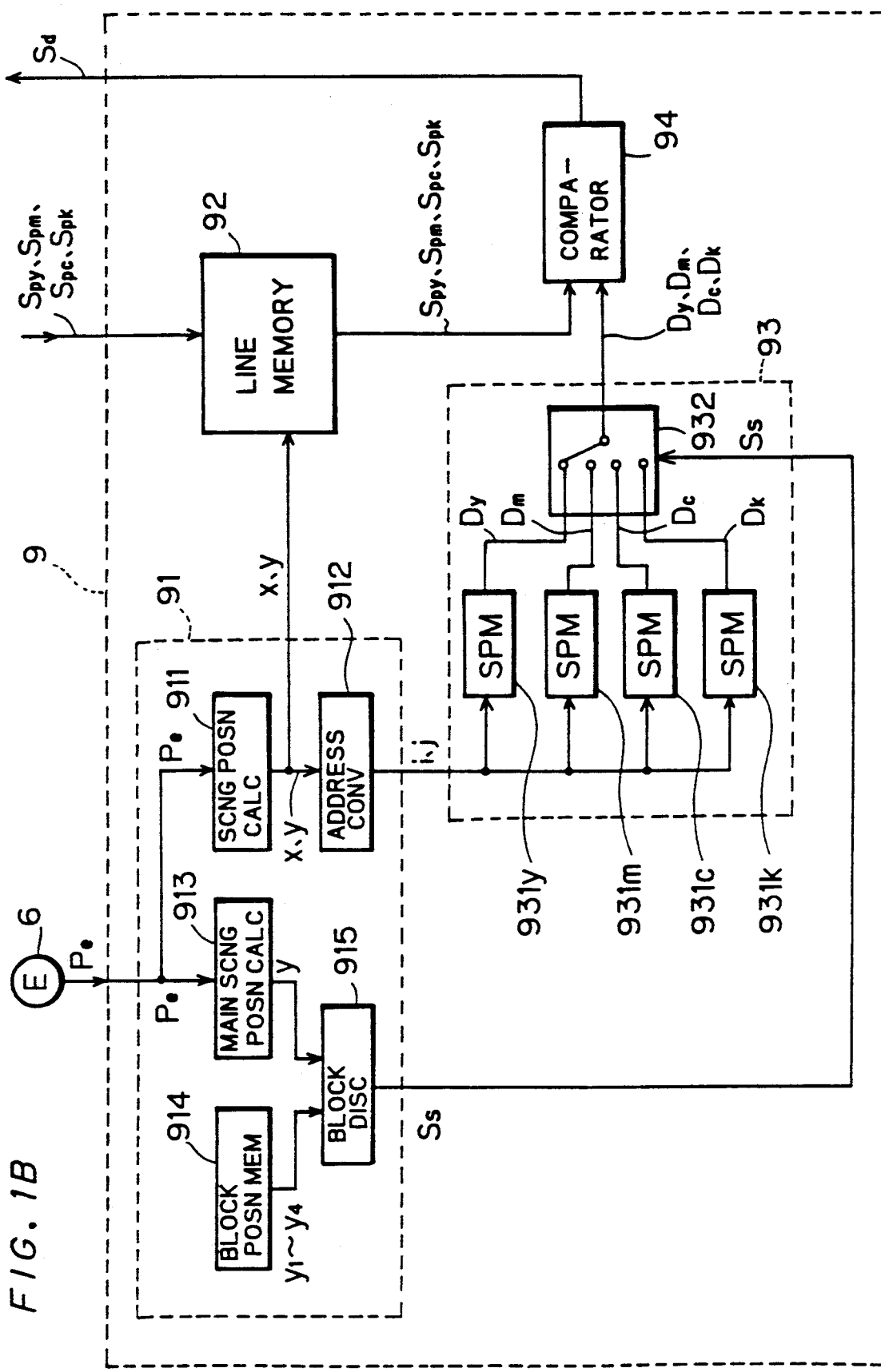

FIG. 1B is a block diagram showing the internal construction of the halftone converter 9 in more detail. The scanning position calculation circuit 91 is a circuit for calculating the scanning positions on the input drum 3 and the output drum 4 on the basis of a pulse signal $P_e$ outputted for every unit of rotational displacement from the rotary encoder 6. The pulse signal $P_e$ is anticipated to a scanning position calculation portion 911, wherein a main scanning coordinate Y and a subscanning coordinate x of the read position on the input drum 3 are calculated. As described above, in operation, the input drum 3 and the output drum 4 are rotated in the direction $\theta$ at a constant speed and the input head 7 moves in the direction x at a constant speed. Hence, by counting the pulses in the pulse signal $P_e$ from a predetermined reference position, not only the main scanning coordinate y of a read pixel but also the subscanning coordinate x thereof can be calculated. In addition, since the recording head 10 moves in the direction x at the same speed as the input head 7 in this preferred embodiment, the recording position on the output drum 4 is the same as the read position (x,y).

Scanning position data (x,y) is given to an address conversion portion 912, wherein an address (i,j) to be given to the SPM portion 93 is calculated.

The SPM portion 93 comprises SPMs $931_y$, $931_m$, $931_c$ and $931_k$ for storing respective screen pattern data $D_y$, $D_m$, $D_c$ and $D_k$ (described later) corresponding respectively to four colors YMCK and a data selector 932 for cyclically selecting one out of the SPMs $931_y$–$931_k$.

A selection signal $S_s$ for switching the data selector 932 is generated in a block discrimination circuit 915 which is provided in the scanning position calculation circuit 91. The selection signal $S_s$ is calculated on the basis of the main scanning position of the record pixel calculated by a main scanning position calculation portion 913 based on the pulse signal $P_e$ from the rotary encoder 6 and the position data $y_1$-$y_4$ of the respective halftone dot images stored previously in a block position data memory 914.

In the block position data memory 914, the values of main scanning coordinates $y_1$-$y_4$ of reference points $O_1$-$O_4$ in each region $R_1$-$R_4$ shown in FIG. 2 are previously stored as block position data. The block position data $y_1$-$y_4$ are previously set by an operator according to the output conditions associated with recording onto the recording film RF. The block discrimination circuit 915 discriminates which of the regions $R_1$-$R_4$ includes the position of the record pixel on the output drum 4, on the basis of the block position data $y_1$-$y_4$ and the main scanning position y calculated in the main scanning position calculation portion 913. The selection signal $S_s$ generated in the block discrimination circuit 915 is given to the data selector 932, and one of the SPMs $931_y$–$931_k$ corresponding respectively to each region $R_1$-$R_4$ is selected.

The comparator 94, receives one of the screen pattern data $D_y$–$D_k$ from the SPM selected in this manner and one of the corresponding printing density data $S_{py}$–$S_{pk}$ is inputted from the line memory 92.

When the printing density data and screen pattern data corresponding to the same record pixel position are thus inputted to the comparator 94, the dot signal $S_d$ indicating whether or not to expose the record pixel is generated according to the result of the comparison between these values. The dot signal $S_d$ is inputted to the recording head as above mentioned, and the respective halftone dot images $I_{y1}$-$I_{k1}$ are recorded in order on the recording film RF. Printing blocks for each color component are produced by the use of the recording film RF and a print is made by using them. Thereby, reproduced images can be produced on printing sheets, which have the dot structure shown in FIG. 3E.

E. Construction of Screen Pattern Data

In such a device, the screen pattern data $D_y$–$D_k$ inside the SPM portion 93 are prepared according to the following rule in order to attain the halftone dot images shown in FIGS. 3A–3D.

Figure 7:
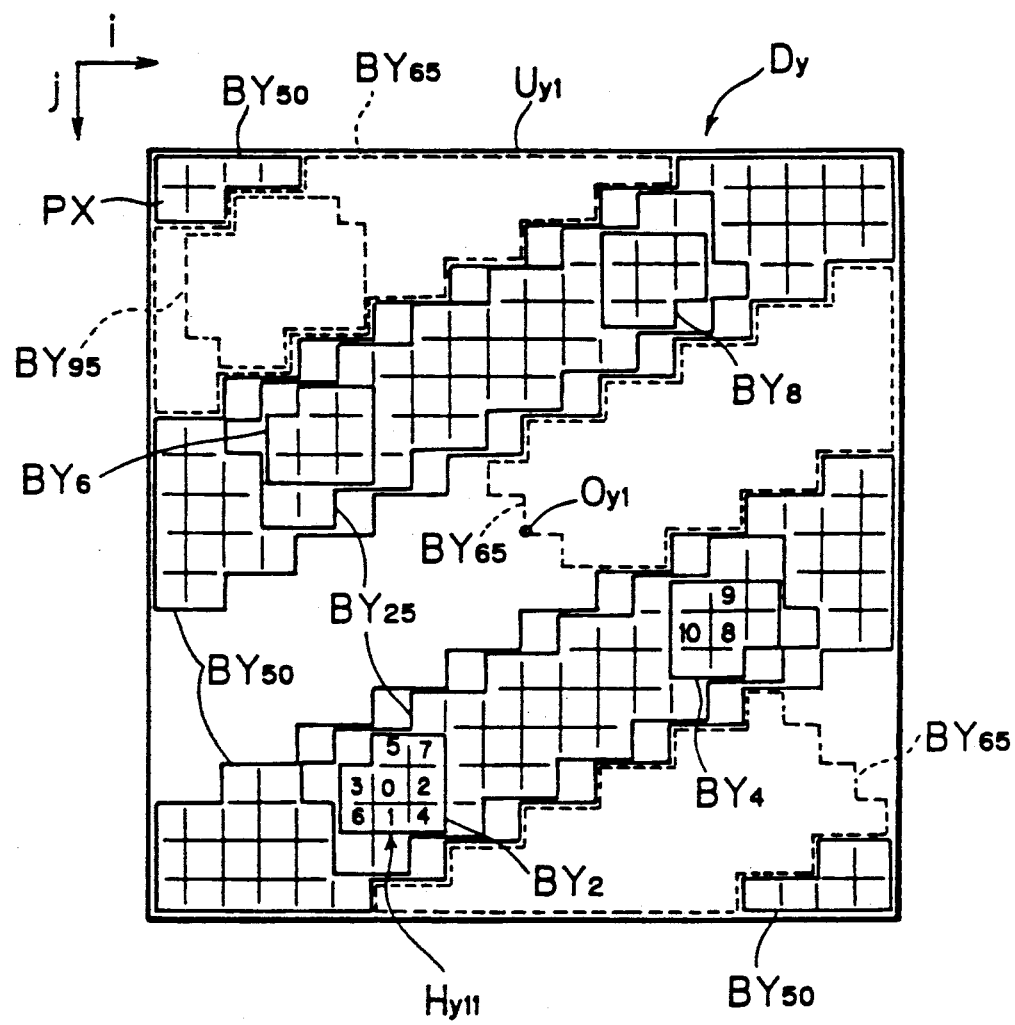
FIG. 7 is a conceptional diagram showing the construction of screen pattern data.

FIG. 7 is a diagram showing conceptually the construction of the screen pattern data corresponding to the changes of a halftone dot in shape. FIG. 7 shows the construction of the screen pattern data $D_y$ corresponding to the halftone dot $H_{y1}(r)$ shown in FIG. 4A. In the screen pattern data $D_y$, one pixel PX is assigned to each address indicated by the screen pattern coordinates (i,j), and a substantial screen ruling $N_{y1}$ of the halftone dot image I digital value is held therein as a predetermined threshold for every pixel. In an example shown in FIG. 7, values 0, 1, 2, ... in ascending order of magnitude are written from the center of the halftone dot forming core $H_{y11}$ toward the periphery thereof. The digital values are, as above mentioned, inputted serially to the comparator 94 for each pixel and compared with the printing density data $S_p$. In the case where the value of the printing density data $S_p$ is larger than that of the screen pattern data, the dot signal $S_d$ for exposing its pixel is outputted from the comparator 94. Thus, the larger the value of the printing density data $S_p$, the larger is the area of one halftone dot recorded shape. FIG. 7 shows border lines $BY_2$, $BY_4$, $BY_6$, $BY_8$, $BY_{25}$, $BY_{50}$, $BY_{65}$ and $BY_{95}$ of the halftone dot recorded shapes in the case of the halftone dot area rate r of 2%, 4%, 6%, 8%, 25%, 50%, 65% and 95%, respectively. Solid border lines $BY_2$, $BY_{50}$ indicate that the inside region of the lines is exposed, and broken lines $BY_{65}$-$BY_{95}$ indicate that the portion other than the inside region of the lines is exposed. As for the unexposed region at the halftone dot area rate r of 50%, the illustration of the classification of the pixels PX is omitted for the sake of simplicity. As understood from FIG. 7, the screen pattern data is a matrix array of threshold levels and the distribution of the threshold levels includes a plurality of valleys $BY_{50}$ extending along the direction $A_{y1}$ (FIG. 5A). The extension direction is different for each color component as understood from FIGS. 4A-4D. A plurality of isolated bottoms $BY_6$ and $BY_8$ (or $BY_2$ and $BY_4$) are provided in each valley.

The prior art needs to prepare the screen pattern data for a wide image region including a plurality of halftone dots for each color component because the screen angles of the respective halftone dot images are set to respectively different values (15°, 45°, 75°, etc.). On the other hand, the present invention has the further advantage that, if the screen pattern data for the image region corresponding to one 100% halftone dot shape are prepared for each color component as shown in FIG. 7, the halftone dots of all image regions can be formed only by adjusting the address (i,j) thereof to the position of the record pixel.

F. The Operational Procedure

FIG. 8 is a flow chart showing the procedure of recording the halftone dot image by the use of the aforesaid device. In the process step S1, the screen pattern data $D_y$–$D_k$ are stored in the SPMs $931_y$–$931_k$. It is also permissible in place of the process step S1 to manually select one of many groups of screen pattern data $D_y$–$D_k$, being registered previously, corresponding to various halftone dot recorded shapes one of the which is shown in FIGS. 4A-4D.

In the process step S2, the original OF and the recording film RF are set respectively on the input drum 3 and the output drum 4.

In the next process step S3, the operator inputs set-up conditions such as a color correction rule in the image data processing circuit 8, by the use of a keyboard and the like.

In the process step S4, while the input drum 3 and the output drum 4, are rotated the original OF is read and recording of the halftone dot image on the recording film RF.

Based on the halftone dot image thus produced, printing blocks for each color component are produced in the process step S5, for overprinting them on a printing sheet to reproduce a color image in the process step S6.

There are some cases where, unlike the case of FIGS. 3E, the halftone dot centers of the respective color component images do not completely coincide due to being out of register in printing in the process step S6. However even in this case the rosetta moire does not occur, because the respective color component images are in the phase relation of parallel translations mutually and the repetition pattern thereof is held approximately the same in size as one halftone dot. At this time, the overlapping portions of each halftone dot also change. However, since the halftone dot recorded shapes for respective color components extend in different extension directions respectively, the area of the overlapping portions does not change extremely due to being out of register, and visible tone change due to a color misplacement does not occur.

G. Modifications

The present invention is not limited to the aforesaid embodiment. For example, the following modifications are available.

(1) In the aforesaid preferred embodiment, four halftone dot forming cores are defined in one repetition unit region. However, the present invention is applicable as long as two or more halftone dot forming cores are defined. FIG. 9A shows a halftone dot $H_{y2}(r)$ having three halftone dot forming cores $H_{y21}$–$H_{y23}$. FIG. 9B shows a halftone dot $H_{y3}(r)$ having two halftone dot forming cores $H_{y31}$ and $H_{y32}$. The substantial screen rulings $N_{y2}$ and $N_{y3}$ of the halftone dot images produced by the halftone dots $H_{y2}(r)$ and $H_{y3}(r)$ are shown in FIG. 6A, and the dot gain amounts $G_{y2}$ and $G_{y3}$ thereof are shown in FIG. 6B.

In the halftone dot $H_{y2}(r)$ shown in FIG. 9A, the first and second halftone dot forming cores $H_{y21}$ and $H_{y22}$ grow along the extension direction $A_{y21}$, and the third halftone dot forming core $H_{y23}$ grows along the extension direction $A_{y22}$ having a difference by 90° from the direction $A_{y21}$. Thus, a plurality of halftone dot forming cores in one halftone dot may grow in respectively different directions to form linear halftone dot components. In such a case, the occurrence of color displacement can be prevented if respective two extension directions in the halftone dot images for other color components (for example, magenta block) are different from the two extension directions $A_{y21}$ and $A_{y20}$ in FIG. 9A.

Figure 10A:
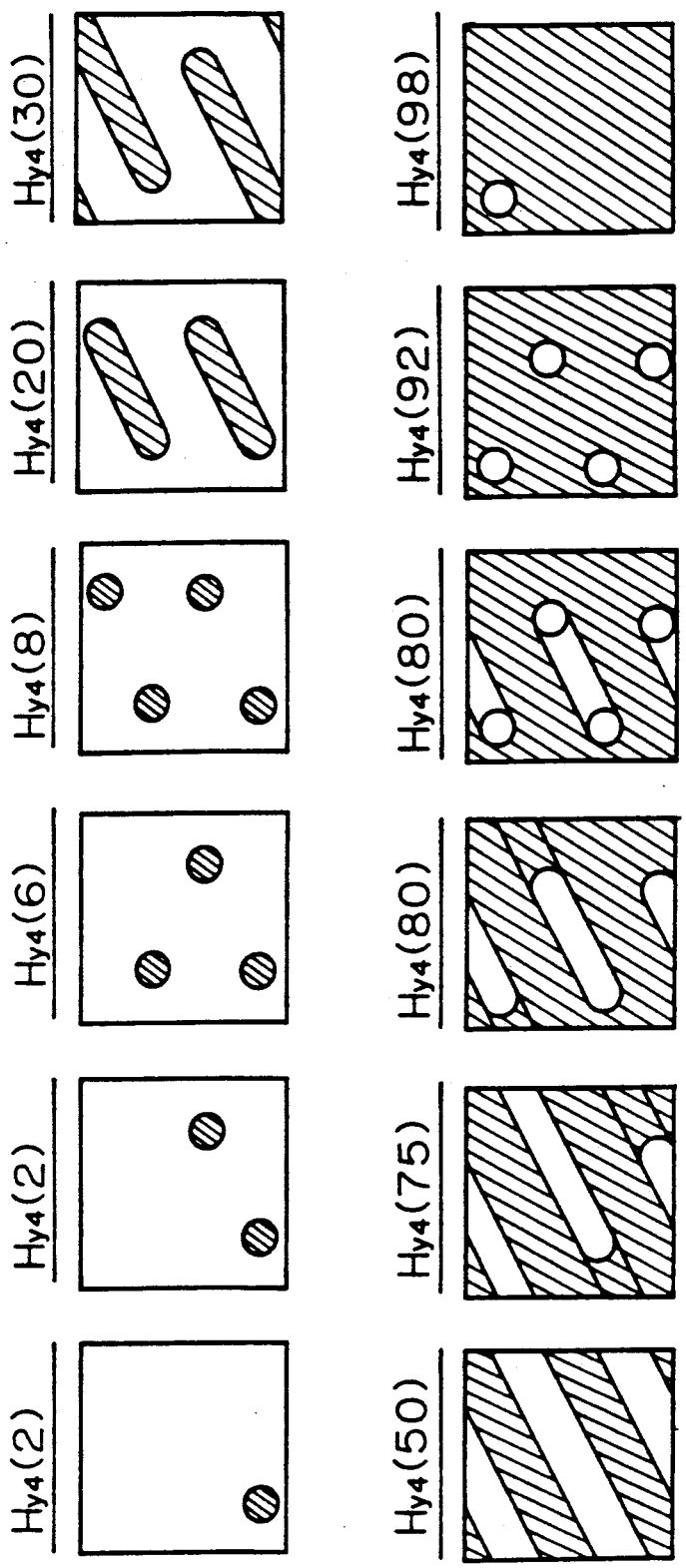
Figure 10B:
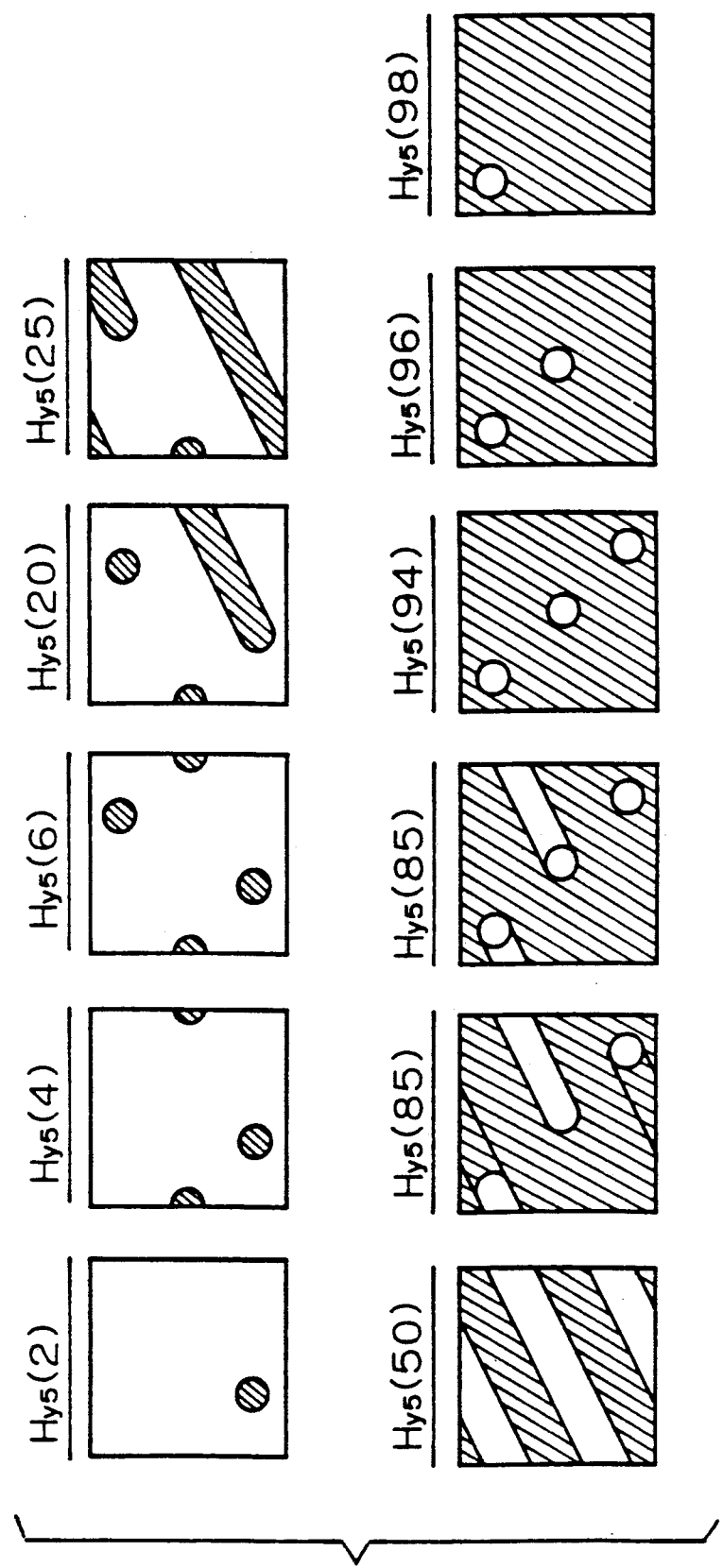
Figure 10C:
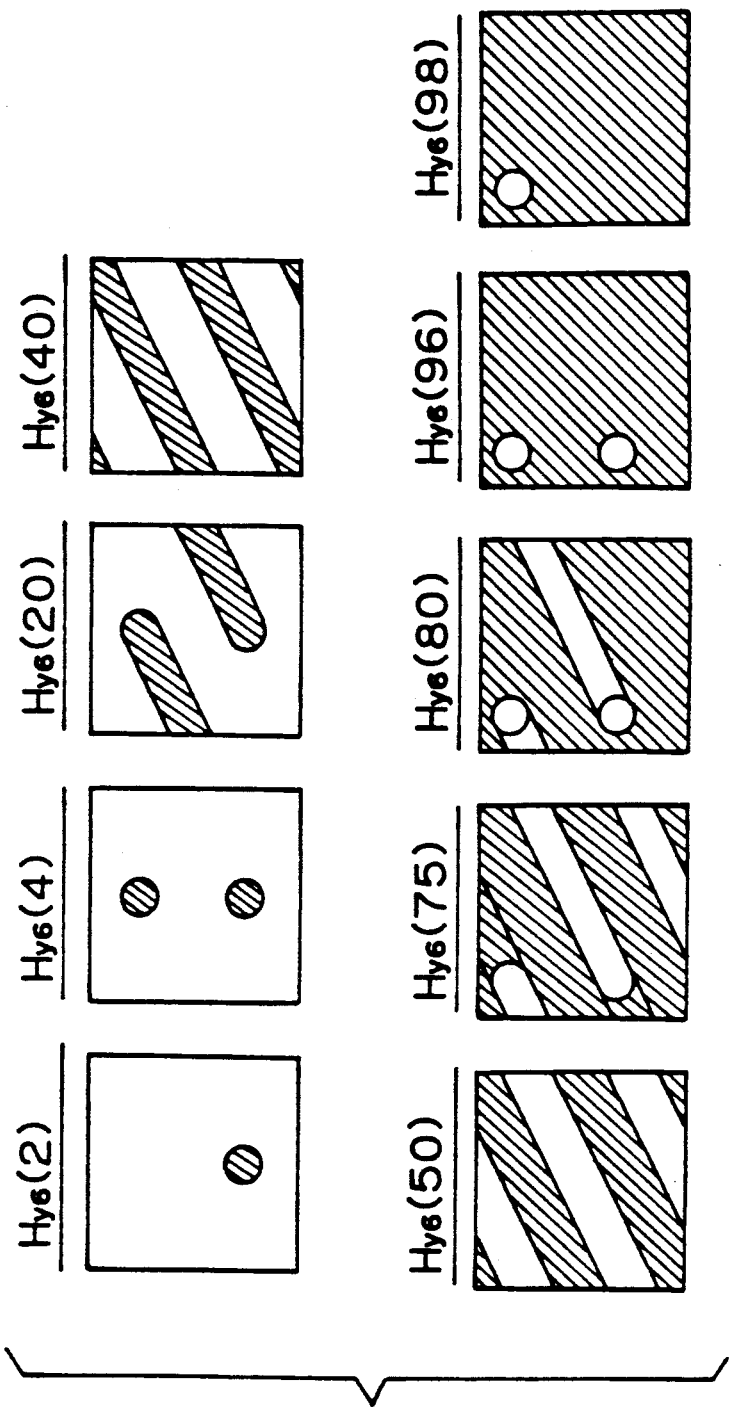

FIGS. 10A–10C show other halftone dots $H_{y4}(r)$, $H_{y5}(r)$ and $H_{y6}(r)$ in the case where the number of the halftone dot forming cores are four, three and two, respectively. In FIGS. 10A–10C, the number of the blank components which are left at a halftone dot area rate of 90% or more is equal to that of the halftone dot forming cores. However, it is permissible if these numbers are different from each other.

(2) In the aforesaid preferred embodiment, the halftone dot forming cores extend in a predetermined direction over the range of the halftone dot area rates r between 8–50% in the halftone dots $H_{y1}$, $H_{m1}$, $H_{c1}$ and $H_{k1}$ of FIGS. 4A–4D. However, such a range of halftone dot area rates r can be arbitrarily determined. For example, the range between 6–50% in the halftone dot $H_{y2}(r)$ of FIG. 9A and the range between 4–50% in the halftone dot $H_{y3}(r)$ of FIG. 9B correspond to the foregoing range of the halftone dot area rates.

In the aforesaid preferred embodiment, furthermore, the blank components have linear shapes extending in predetermined direction and the length thereof is reduced along the direction over the range of the halftone dot area rates r of 50% or more in the halftone dots $H_{y1}$, $H_{m1}$, $H_{c1}$ and $H_{k1}$ of FIGS. 4A–4D. This range of the halftone dot area rates can be also determined arbitrarily.

(3) The respective halftone dot components extending from a plurality of halftone dot forming cores are substantially equivalent in shape and area to each other.

In FIGS. 4, 9A. 9B and 10A–10C, the change of the halftone dot component in shape is specified so that the differences in area between the respective halftone dot components (hereinafter referred to as "halftone dot components equivalent to each other") extending from a plurality of halftone dot forming cores should be 2% or less in halftone dot area rate. Preferably, the differences in area between the halftone dot components equivalent to each other are not more than a minimum printable area. The minimum printable area is, 2% or 4% for instance, differing according to the screen ruling (the nominal screen ruling), the type of ink, the type of printing paper and the like.

(4) In the aforesaid preferred embodiment, the halftone dot images are produced for each of the four colors YMCK. The combination of colors is not necessarily limited to the foregoing. Various combinations thereof are employable. For example, the present invention can be applied to the case of producing the halftone dot images corresponding to two colors, black and brown, for doubletone printing with these colors.

That is, all present invention is applicable to the cases where halftone dot images are produced with at least two color components.

(5) The halftone dot image is not limited to the case where it is exposed and recorded on a recording film, but to cases where it is recorded on other recording mediums. For example, the printing block itself can be the recording medium in a device which reads the original and produces printing blocks for each color component directly ("direct plate making").

(6) The shape of the halftone dot element is not limited to a line as shown in FIGS. 4A–4D. An elongated ellipse or a shape like that which is called a chain dot is available. However, in the case of these other shapes, the shape wherein the length along a predetermined extension direction is greater than that along another direction over the range of predetermined halftone dot area rates is preferred. "Linear" is a broad term including various shapes.

(7) In the aforesaid embodiment, means for generating the screen pattern data $D_y$–$D_k$ may be generated by other constructions as well as those shown in FIGS. 1A and 1B. In particular, when two halftone dot recorded shapes ($H_{y1}(r)$ and $H_{m1}(r)$, for example) have the 90° rotation shown in FIGS. 4A–4D, one screen pattern data can be obtained only by interchanging between i and j in the addresses (i.j) of the other screen pattern data which is stored in an SPM.

(8) If a halftone dot font is prepared in accordance with the density (or gradation) and the density signal of the image is converted into the corresponding halftone dot font, the same halftone dot image as above-mentioned can be obtained.

As described above, according to the present invention, the same array pitch and array angle of the repetition unit region are set respectively in a plurality of halftone dot images for respective color components, thereby the unit region of the repetition pattern in the reproduced image is substantially the same in size as the halftone dot to prevent the occurrence of rosetta patterns.

In addition, since the halftone dot recorded shape in a halftone dot image is for each color component formed as a collection of the lines extending in an extension direction which is different from that for other color components, the present invention is effective in that the area of the overlapping portions between the halftone dot recorded shapes does not change extremely by being out of register and color misplacement is prevented.

Furthermore, a plurality of halftone dot forming cores are defined in the repetition unit region of the halftone dot, and the halftone dot recorded shape is formed by a collection of the lines extending on the basis of the respective halftone dot forming cores over the range of predetermined halftone dot area rates. Hence, the present invention also increasing the screen ruling substantially over the range of these halftone dot area rates and consequently improves the resolution of the printed matters.

The present invention has further effects of the screen ruling substantially over the second range of the halftone dot area rates and consequently improves the resolution of printed matters when the shape of the blank region, other than the region of the halftone dot recorded shape in the repetition unit region, is defined to comprise a plurality of linear shapes over the second range of the halftone dot area rates.

Although the present invention has been described and illustrated in detail, it is clearly understood that the same is by way of illustration and example only and is not to be taken by way of limitation. The spirit and scope of the present invention should be limited only by the terms of the appended claims.

I claim:

1. A method of recording a halftone dot color image on a recording medium, comprising the steps of:
   (a) separating an original image into a plurality of color component images;
   (b) converting said plurality of color component images into a plurality of color component halftone dot images under a procedure including the following conditions (b-1) through (b-5);
   (b-1) said plurality of color component halftone dot images have respective arrays of unit regions defining cells in halftone dot representation;
   (b-2) said respective arrays of unit regions have a substantially same array pitch and a substantially same orientation;
   (b-3) a plurality of core positions are defined in each unit region in said respective arrays;
   (b-4) a plurality of linear dot elements which have a substantially same area and which extend from said plurality of core positions along respective predetermined directions are obtained in said unit regions when a halftone dot area rate of corresponding color component halftone dot image is in a predetermined range of dot area rate; and
   (b-5) said respective predetermined directions are different for each color component halftone dot image; and
   (c) overprinting said plurality of color component halftone dot images on a recording medium to obtain a halftone dot color image on said recording medium.

2. The method of claim 1, wherein:
said respective predetermined directions are respective predetermined first directions;
said range is a first range of dot area; and
said procedure further includes the following conditions (b-6) and (b-7);
(b-6) a plurality of linear blank elements which extend along respective predetermined second directions are obtained in said unit regions when a halftone dot area rate of a corresponding color component halftone dot image is in a predetermined second range of dot area rate;
(b-7) said respective predetermined second directions are different for each color component halftone dot image.

3. The method of claim 2, wherein:
said respective predetermined first directions are identical to said respective predetermined second directions within each color component halftone dot image.

4. The method of claim 3, wherein:
said plurality of linear dot elements are parallel to each other; and
said plurality of linear blank elements are parallel to each other.

5. The method of claim 4, wherein:
said procedure further includes the following condition (b-8):
(b-8) one or more dot cores are obtained at one or more positions included in said plurality of core positions when a halftone dot area rate of a corresponding color component halftone dot image is in a predetermined third range of dot area rate.

6. The method of claim 5, wherein:
the condition (b-8) includes the condition that the number of said dot cores in each unit region increases as a halftone dot area rate of a corresponding color component halftone dot image increases.

7. The method of claim 6, wherein:
said procedure further includes the following condition (b-9):
(b-9) said dot cores grow in said respective predetermined first directions as a halftone dot area rate of a corresponding color component halftone dot image increases over said predetermined third range of dot area rate.

8. The method of claim 7, wherein:
the condition (b-9) includes the condition that each of said dot cores grows sufficiently to be connected with another dot core, whereby said plurality of linear dot elements are obtained.

9. The method of claim 8, wherein:
said procedure further includes the following condition (b-10):
(b-10) said plurality of linear dot elements form a stripe pattern when a halftone dot area rate of a corresponding color component halftone dot image is about fifty percent.

10. The method of claim 2, wherein:
said procedure further includes the following condition (b-11):
(b-11) said plurality of linear blank elements are shortened as a halftone dot area rate of a corresponding color component halftone dot image increases within said predetermined second range of dot area rate.

11. The method of claim 10, wherein:
the condition (b-11) includes the condition that said plurality of linear blank elements are shortened and then disappear one by one as a halftone dot area rate of a corresponding color component halftone dot image increases within said second range of dot area rate.

12. The method of claim 1, wherein;
said arrays of unit regions are matrix arrays having square unit regions.

13. The method of claim 3, wherein:
said plurality of color component halftone dot images have four color component halftone dot images; and
said respective predetermined first directions for said four color component halftone dot images are respectively displaced by 120°, 30°, 150° and 60° from a predetermined reference direction.

14. A color process scanner, comprising:
(a) means for reading an original image and for generating color component signals representing said original image for each color component;
(b) means for generating screen pattern signals represented predetermined threshold levels for each color component;
(c) means for comparing said color component signals with said screen pattern signals for each color component and for generating for each pixel halftone dot signals corresponding to respective color components;
(d) means for modulating light in accordance with said halftone dot signals for respective color components and for each pixel; and
(e) means for relatively moving said light and a photosensitive film so that said light scans said photosensitive film to record color component halftone images on said recording film;
said means for generating the screen pattern signals including;
means for generating said screen pattern signals under a procedure which complies with the following conditions (b-1) through (b-3);
(b-1) said threshold levels are assigned to respective pixels in a matrix pixel array for each color components, said matrix pixel array having a same array size and a same orientation for all color components;
(b-2) a distribution of said threshold levels in said matrix pixel array includes a plurality of valleys extending along a predetermined direction for each color component; and
(b-3) said predetermined direction is different for each color component.

15. The color process scanner of claim 14, wherein:
said procedure is further subject to the condition
that a plurality of isolated bottoms are provided in each valley.

* * * * *